United States Patent [19]

Moonen et al.

[11] 4,145,036

[45] Mar. 20, 1979

[54] VEHICLE SUSPENSION DEVICE

[75] Inventors: August G. L. Moonen, Ulbeek; Eugene A. H. Moyaerts, Sint-Truiden, both of Belgium

[73] Assignee: Monroe Auto Equipment Company, Monroe, Mich.

[21] Appl. No.: 875,549

[22] Filed: Feb. 6, 1978

Related U.S. Application Data

[63] Continuation of Ser. No. 746,711, Dec. 2, 1976, abandoned.

[51] Int. Cl.² .................................................. F16F 13/00
[52] U.S. Cl. .................................... 267/8 R; 267/34
[58] Field of Search ............... 267/8 R, 23, 34, 64 B, 267/65 R, 177; 16/51, 52, 66; 188/314

[56] References Cited

U.S. PATENT DOCUMENTS

| | | | |
|---|---|---|---|
| 2,902,274 | 9/1959 | McIntyre | 267/8 R |
| 3,251,591 | 5/1966 | McNally | 267/8 R |
| 4,030,713 | 6/1977 | Palmer | 267/8 R |

FOREIGN PATENT DOCUMENTS 938352 1/1956 Fed. Rep. of Germany .......... 267/8 R

*Primary Examiner*—Johnny D. Cherry
*Attorney, Agent, or Firm*—Harness, Dickey & Pierce

[57] ABSTRACT

A vehicle suspension device comprising a telescopic shock absorber including an elongated tubular housing, a piston reciprocable within the housing and connected to one end of a piston rod extending axially outwardly from one end of the housing, a tubular dirt shield supported on one end of the piston rod and extending coaxially of the rod and the housing, a helical coil spring extending coaxially of the housing and the dirt shield, and first and second support flanges located at the axially opposite ends of the coil spring, with one of the flanges being axially removable from the device by a simple rotative and axial manipulation thereof, whereby to provide for removal, replacement or similar interchanging of the coil spring.

2 Claims, 5 Drawing Figures

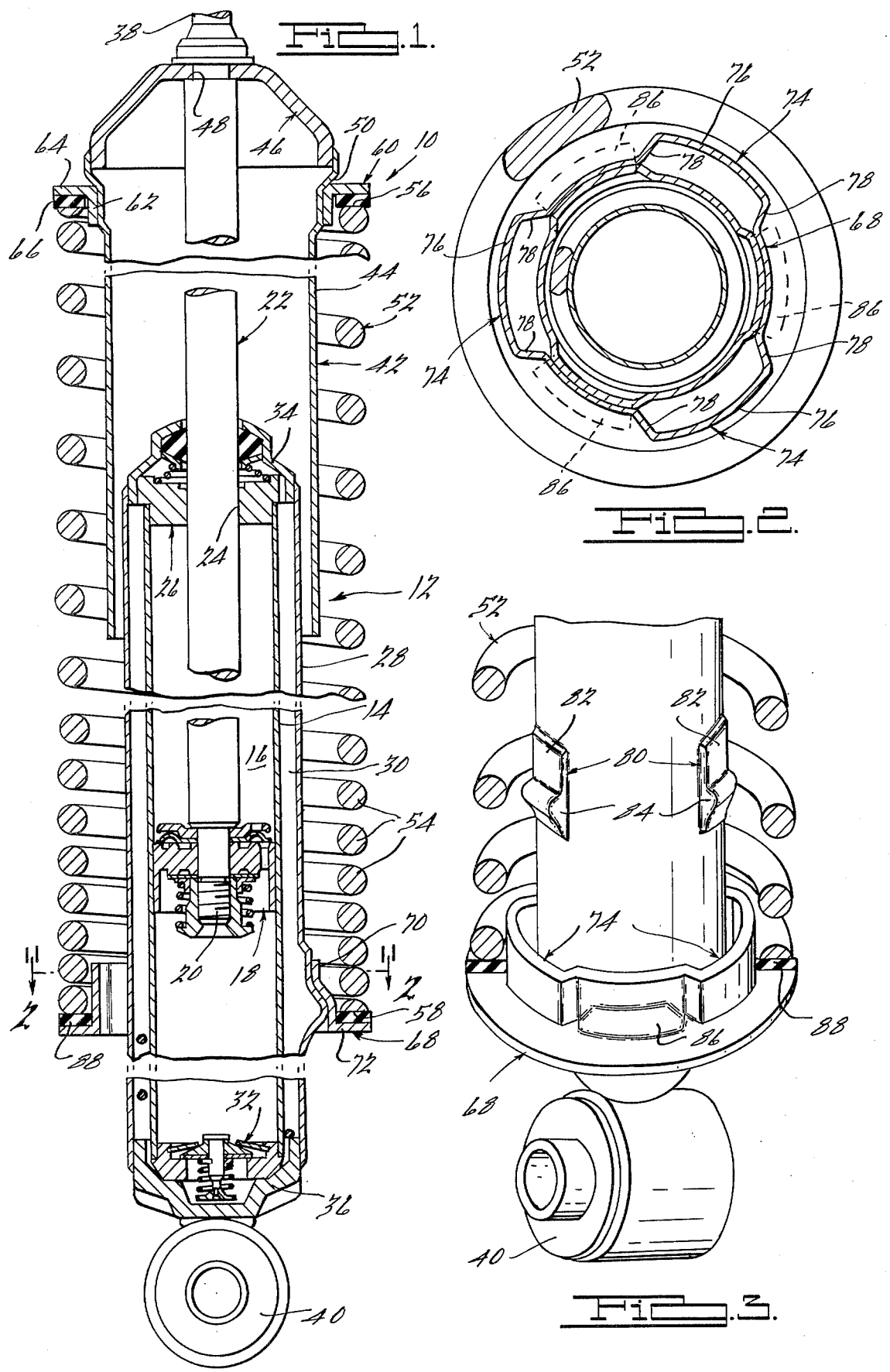

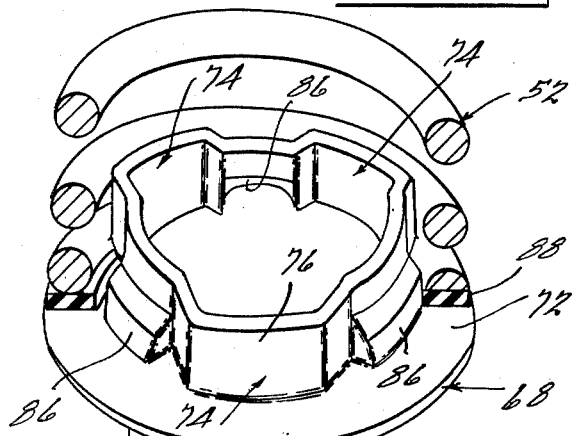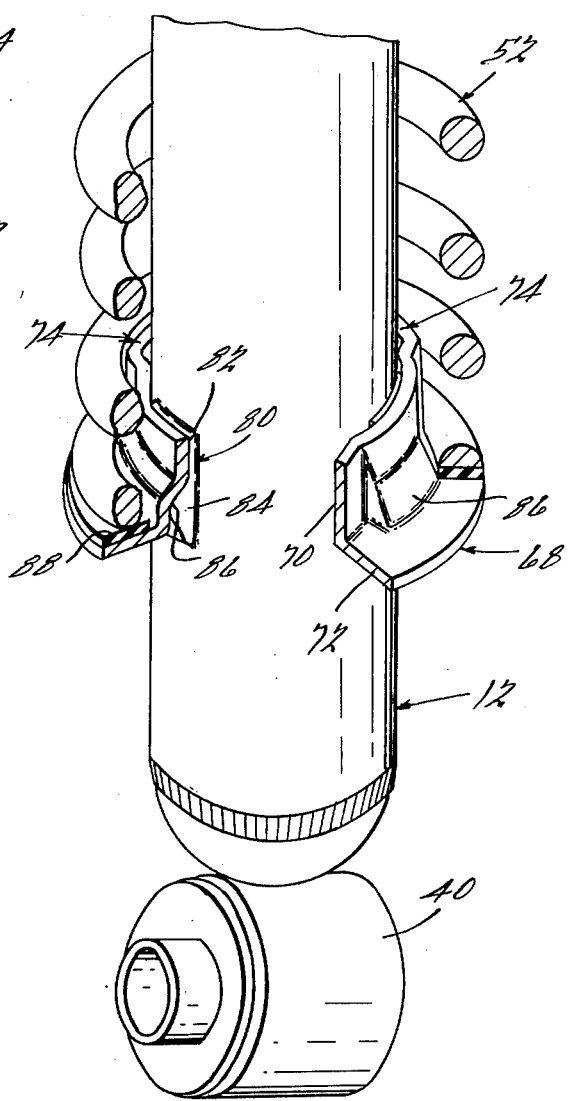

VEHICLE SUSPENSION DEVICE

This is a continuation of application Ser. No. 746,711 filed Dec. 2, 1976, now abandoned.

SUMMARY OF THE INVENTION

This invention relates generally to vehicle suspension devices and more particularly, to a new and improved combination hydraulic shock absorber and coil spring arrangement for use in the suspension systems of automotive vehicles and the like.

It is accordingly, a general object of the present invention to provide a new and improved suspension device for automotive vehicles.

It is a more particular object of the present invention to provide a new and improved combination hydraulic shock absorber and coil spring arrangement which may be incorporated in the suspension systems of automobiles and similar vehicles.

It is yet a more particular object of the present invention to provide a new and improved arrangement for operatively supporting a helical coil spring upon a hydraulic direct acting telescopic shock absorber.

It is still a further object of the present invention to provide a new and improved vehicle suspension device, as above described, which provides means for conveniently removing the coil spring for purposes of inspection, repair, replacement and the like.

It is still a further object of the present invention to provide a new and improved vehicle suspension device of the above character which will find universality of application on various types of vehicle shock absorbers.

It is still a further object of the present invention to provide a new and improved vehicle suspension device of the above described type that is of a relatively simple design, is economical to commercially manufacture, and which will have a long and effective operational life.

Other objects and advantages of the present invention will become apparent from the following detailed description, taken in conjunction with the accompanying drawings.

BRIEF DESCRIPTION OF THE DRAWINGS

FIG. 1 is a transverse cross-sectional view of a suspension device in accordance with the principles of the present invention;

FIG. 2 is a cross-sectional view taken substantially along the line 2—2 of FIG. 1;

FIG. 3 is an elevated perspective view, partially broken away, of the lower end of the suspension device shown in FIG. 1;

FIG. 4 is an exploded assembly view similar to FIG. 3 and illustrates the various components thereof in a partially assembled configuration; and FIG. 5 is a fully assembled view, partially broken away, of the components shown in FIGS. 3 and 4.

DETAILED DESCRIPTION OF THE PREFERRED EMBODIMENT

Referring now in detail to the drawings, and in particular to FIG. 1 thereof, a vehicle suspension device 10, in accordance with one preferred embodiment of the present invention, is shown as including a hydraulic direct acting telescopic shock absorber 12 comprising an elongated tubular pressure cylinder 14 that defines an internal working chamber 16. Disposed within the chamber 16 is a valved piston 18 which is fixedly secured to a reduced diameter end portion 20 of an elongated reciprocable piston rod 22 that extends axially upwardly from the upper end of the pressure cylinder 14 and is reciprocable concomitantly with the piston 18 in a manner well known in the art. The piston rod 22 has the upper end thereof extending through a central opening 24 in a combination rod guide and seal assembly, generally designated by a numeral 26, which functions to close the upper end of the chamber 16 and slidably and sealingly support the piston rod 22 for the aforementioned reciprocable movement relative thereto. Disposed around the outer periphery of the pressure cylinder 14 is a concentric reserve tube or housing 28 which is coextensive of the pressure cylinder 14 and defines a fluid reservoir 30 therewith. The reservoir 30 is communicable with the chamber 16 via a base or compression valve assembly, generally designated 32, which is located at the lower end of the pressure cylinder 14 and functions to selectively control the flow of hydraulic operating fluid between the reservoir 30 and chamber 16. The upper and lower ends of the shock absorber 12 are closed by conventional cup-shaped end caps 34 and 36, which are operatively secured, as by welding or the like, to the opposite ends of the housing and reservoir tube 28. Means in the form of suitable attachment fittings or the like 38 and 40 are provided on the outer or terminal end of the piston rod 22 and end cap 36, respectively, for securing the suspension device 10 of the present invention to the sprung and unsprung portions of the associated vehicle, in a manner well known in the art.

For purposes of conciseness of description, the piston 18 and base valve assembly 32 are of substantially the same construction and operation as the analogous components described in U.S. Pat. No. 3,771,626, owned by the assignee hereof and the disclosure of which is incorporated by reference herein.

As best seen in FIG. 1, the suspension device 10 is provided with an elongated cylindrical dirt shield assembly, generally designated by the numeral 42, which includes a tubular dirt shield member 44 that is arranged concentrically of the upper end of the piston rod 22 and housing 28. The upper end of the dirt shield member 44 is fixedly secured to the adjacent end of the piston rod 22 by means of a generally cup-shaped end cap 46 that is secured to the dirt shield member 44, as by welding or the like. The end cap 46 is formed with a central opening 48 through which the upper end of the piston rod 22 extends, with the upper fitting 38 being secured as by welding or the like to the upper side of the end cap 46. The upper end of the dirt shield member 44 is formed with a radially outwardly extending shoulder 50 which functions in a manner hereinafter to be described in operatively supporting the upper end of an elongated helical coil spring 52 which is arranged concentrically of the shock absorber 12, as illustrated. The coil spring 52 is intended to function as an auxiliary suspension element for the sprung portion of the associated vehicle and may be of the variable rate type and as such, comprises varying numbers of spring convolutions 54 along the length thereof. In the embodiment of the invention shown in FIG. 1, a greater number of convolutions 54 of the spring 52 are located toward the lower end of the device 10, while a lesser number thereof are located at the upper end of the device 10. Of course, variations of this arrangement may be readily employed with the present invention without departing from the scope or fair meaning thereof. The spring 52 is provided with upper and lower terminal ends 56 and 58, respectively, the former of which is adapted to be supported by an upper spring support flange, generally designated by the numeral 60. The flange 60 includes a generally axially extending annular section 62 which terminates at the upper end thereof in an integral radially outwardly extending section 64. The inner diameter of the flange 60 is slightly larger than the outer diameter of the dirt shield member 42 but is smaller in diameter than the shoulder 50 formed in the upper end thereof, whereby the flange 60 may be biased upwardly under the influence of the spring 52 and be fixedly retained in engagement with the shoulder 50, as illustrated. A suitable resilient bearing pad, as designated by the numeral 66, is preferably interposed between the radial section 64 of the flange 60 and the upper end 56 of the spring 52.

The lower end of the coil spring 52 is operatively supported by means of a lower annular spring support flange, generally designated 68, which is adapted to be secured to the outer periphery of the housing and reserve tube 28. The flange 68 is generally similar to the aforementioned flange 60 and as such, comprises a generally axially extending section 70 which terminates at its lower end with a radially outwardly extending section 72. The axially extending section 70 of the flange 68 is a diameter which is slightly larger than the outer diameter of the housing 28 and as such is adapted to be moved axially or longitudinally therealong to its operative position shown in FIG. 1, for example. As best seen in FIG. 2, the axially extending section 70 of the flange 68 is formed with three equally circumferentially spaced radially outwardly projecting sections, generally designated by the numeral 74. Each of the sections 74 comprises a circumferential part 76 and generally radially disposed end parts or portions 78 which integrally connect the circumferential parts 76 with the main body of the radial section 72 of the flange 68. The circumferential dimensions of each of the sections 74 is approximately equal to the circumferential spacing therebetween, and as such, the sections 74 are adapted to cooperate with a plurality of radially outwardly projecting embossments, generally designated by the numeral 80, which are formed or provided on the exterior surface of the member 28, as seen in FIGS. 3 and 4. The embossments 80 are axially aligned and are equally circumferentially spaced around the periphery of the housing 28. The circumferential spacing between each of the embossments 80 is approximately equal to the circumferential spacing between the outwardly projecting sections 74 of the flange 68, and the width of each of the embossments 80 is approximately equal to the circumferential dimension between the end parts 78 of each of the sections 74.

As best seen in FIG. 4, each of the embossments comprises upper and lower portions 82 and 84, respectively, the latter of which projects radially outwardly in substantially greater amount than the former. The circumferential parts 76 of the sections 74 are spaced radially outwardly from the diameter of the axial section 70 of the flange 68 a distance in excess of the radially outermost (lower) portions 84 of the embossments 80, whereby when the flange 68 is moved axially along the housing 28 with the sections 74 circumferentially aligned with the embossments 80, i.e. as shown in FIG. 3, the flange 68 will not engage the embossments 80. It should be noted that the embossments 80 may be formed integrally of the body of the housing 28 or alternatively, may consist of separate elements fixedly secured thereto, as by welding or the like, as will be appreciated by those skilled in the art.

Disposed between each of the plurality of radially outwardly projecting sections 74 of the flange 68 is a radially outwardly projecting recess 86 which faces toward the lower end of the flange 68 and is of a generally complementary configuration in transverse (radial) cross-section with respect to the shape of the embossments 80, the respective recesses 86 being adapted to nestingly receive the embossments 80 upon operative assembly of the lower spring support flange 68 on the housing 28 in a manner hereinafter to be described. Preferably, a suitable resilient pad 88, similar to the pad 66, is provided interjacent the lower end 58 of the spring 52 and the upper side of the radial section 72 of the lower spring support flange 68.

Referring now to the method of assembly of the spring 52 and lower spring support flange 68 upon the suspension device 10, assuming that the upper spring support flange 60 is operatively engaged with the shoulder 50 and that the coil spring is thereafter concentrically arranged upon the device 10, the lower spring support flange is thereafter mounted on the lower end of the device 10, and is rotatably or circumferentially arranged in the position shown in FIG. 3 wherein the plurality of radially outwardly projecting sections 74 are axially aligned with the embossiments 80. Thereafter, the flange 68 is moved axially of the device 10 causing the spring 52 to compress. The flange 68 is then moved axially relative to the housing 28 to a position beyond (above) the embossments 80. Thereafter, the entire flange 68 is rotated approximately 30° relative to the housing 28 to a position wherein each of the recesses 86 is aligned with one of the embossments 80, whereupon the flange 68 may be moved axially downwardly from the position shown in FIG. 4 to the position shown in FIG. 5 under the influence of the compression spring 52 such that the embossments 80 are nestingly received within the recesses 86, as illustrated. In this position, the spring support flange 68 is positively retained upon the housing 28 without the need for ay ancillary fastening devices, i.e. spring clips, retaining rings, etc., as have been necessary in the prior art. If it is desired to subsequently remove the spring 52 from the device, the spring support flange 68 is moved axially upwardly from the position shown in FIG. 5 to the position shown in FIG. 4, whereupon the flange 68 may be rotated such that the sections 74 thereof are axially aligned with the embossments 80, whereupon the flange 68 may be moved axially from the position shown in FIG. 4 to the position shown in FIG. 3 to permit disassembly of both the flange 68 and the spring 52.

It should be noted that the embossments 80, and in particular the upper and lower portions 82 and 84 thereof provide positive locking engagement of the embossments 80 within the recesses 86, whereby to assure against any relative movement of the flange 68 with respect to the housing 28. Additionally, it will be appreciated that it is not always necessary to provide three embossments 80 and three radially outwardly projecting sections 74 on the flange 68. Instead, two of such embossments 80 and sections 74 could be used or a number larger than three thereof, depending upon the diameter of the suspension device 10 and the loading to which the spring support flange 68 is to be subjected. It is also to be noted that while the suspension device 10 illustrated and described hereinabove is shown as incorporating the dirt shield 42, the principles of the present invention may be readily applicable to a suspension device of the type not incorporating such dirt shields, i.e. wherein the upper end of the spring 52 bears directly upon the upper end cap 46 or upon some fixed portion of the sprung part of the associated automotive vehicle.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. A vehicle suspension device comprising,
   a telescopic shock absorber including an elongated tubular housing,
   a piston reciprocably disposed within said housing and connected to one end of a piston rod extending axially outwardly from one end of said housing,
   attachment means on the outer end of said piston rod and on the end of said housing opposite said piston rod for securing said device to the sprung and unsprung portions of an associated vehicle,
   a helical coil spring extending coaxially of said shock absorber,
   first and second spring support members for supporting the opposite ends of said spring,
   one of said spring support members including a spring support flange member,
   said flange member having a spring support portion and a sleeve portion adapted to have part of said housing extend therethrough, and
   a plurality of circumferentially spaced, radially outwardly projecting embossments formed in the peripheral wall of said housing for affixing said flange member to said device,
   each of said embossments comprising an upper portion and a lower portion, with said upper portions being defined by a first diameter imaginary circle which is larger in diameter than the outer diameter of said housing, and said lower portions being defined by a second diameter imaginary circle whose diameter is larger than the diameter of said first imaginary circle,
   said sleeve portion of said flange member having circumferentially spaced, axially extending lands and radially outwardly projecting grooves corresponding in number to the number of said embossments,
   said grooves being defined by a third diameter imaginary circle having an inner diameter slightly larger than the diameter of said second imaginary circle,
   said lands having upper and lower portions, with said upper portions being defined by a fourth diameter imaginary circle and said lower portions being defined by a fifth diameter imaginary circle, said fourth diameter imaginary circle being equal or slightly larger in diameter than said first diameter imaginary circle and said fifth diameter imaginary circle being equal or slightly larger than the diameter of said second diameter imaginary circle, and both said fourth and fifth diameter imaginary circles being smaller in diameter than said third diameter imaginary circle and larger in diameter than the diameter of said housing,
   whereby when said flange member is rotated relative to said housing to a position wherein said embossments are in registry with said lands and said housing and said flange member are thereafter moved axially of one another,
   said upper and lower portions of said embossments will move into locking engagement with said upper and lower portions, respectively of said lands, to secure said flange member directly upon said housing.

2. The invention as set forth in claim 1 wherein said device includes a dirt shield arranged concentrically of said device and secured at one end thereof to said piston rod, and wherein one of said first and second spring support members is operatively mounted on said dirt shield.

* * * * *